United States Patent [19]
Caruso et al.

[11] 3,876,604
[45] Apr. 8, 1975

[54] CURING WITH DISPERSED COMPLEXES OF SELECTED DIAMINES AND ALKALI SALTS

[75] Inventors: Paul P. Caruso; John J. Verbanc, both of Wilmington, Del.

[73] Assignee: E. I. du Pont de Nemours and Company, Wilmington, Del.

[22] Filed: Aug. 13, 1973

[21] Appl. No.: 387,791

Related U.S. Application Data

[63] Continuation-in-part of Ser. No. 332,289, Feb. 14, 1973, abandoned.

[52] U.S. Cl.. 260/31.8 S; 252/431 N; 260/33.6 UB; 260/34.2
[51] Int. Cl. ............................................. C08c 11/36
[58] Field of Search .............. 260/31.8 S, 33.6 AQ, 260/33.6 UG, 34.2; 252/431 N

[56] References Cited
UNITED STATES PATENTS

| | | | |
|---|---|---|---|
| 2,773,048 | 12/1956 | Formo | 260/37 EP |
| 2,938,010 | 5/1960 | Bluestein | 260/37 SB |
| 3,194,781 | 7/1965 | Hedberg et al. | 260/34.2 X |
| 3,459,683 | 8/1969 | McCoy et al. | 252/49.7 |
| 3,562,198 | 2/1971 | Slocombe | 260/34.2 X |
| 3,583,937 | 6/1971 | Damusis | 260/34.2 X |
| 3,755,261 | 8/1973 | Van Gulick | 260/47 EN X |

OTHER PUBLICATIONS

N. P. Marullo & R. A. Lloyd, Journal of the American Chemical Society, Vol. 88:5, (Mar. 1966), pp. 1076–1077.

*Primary Examiner*—Donald E. Czaja
*Assistant Examiner*—S. M. Person

[57] ABSTRACT

Amine-curable polymers are cured effectively by using a dispersion of complexes of 4,4'-methylene dianiline and/or racemic 2,3-di(4-aminophenyl) butane and selected alkali metal salts including sodium chloride. The particle size within the dispersion is such that at least about 90% of the particles have a diameter of no more than about 60 microns and preferably no more than about 30. The vehicle for the dispersion is an inert organic liquid preferably, di(2-ethylhexyl)phthalate.

17 Claims, No Drawings

3,876,604

CURING WITH DISPERSED COMPLEXES OF SELECTED DIAMINES AND ALKALI SALTS

RELATED APPLICATIONS

This application is a continuation-in-part of U.S. Ser. No. 332,289 for CURING WITH DISPERSED COMPLEXES OF SELECTED DIAMINES AND ALKALI SALTS which was filed on Feb. 14, 1973 for Paul P. Caruso and John J. Verbanc, and is now abandoned. This application is related to Ser. No. 407,266 filed Oct. 17, 1973 and to Ser. No. 378,551 filed July 12, 1973.

BACKGROUND OF THE INVENTION

The curing of amine-curable polymers, such as isocyanato-terminated polyurethane prepolymers, epoxy resins and millable halogen-containing hydrocarbon polymers, is well known. In the past, curing has generally involved mixing the amine curing agent with the curable polymer by means suitable for the materials involved and forming the mixture into a useful form, followed by a heating step to complete the curing reaction. A problem which is encountered in this prior art procedure is the premature reaction of the curing agent with the curable polymer during the mixing step and during the interval following milling until the forming operation is completed. The problem posed by premature reaction or curing varies widely in degree for different amine curing agent/polymer systems, but must be taken into consideration in most instances. In most reactive systems such as those employing isocyanato-terminated polyurethane prepolymers the problems resulting from prereaction have previously necessitated the use of special low residence time mixers and selected diamines of reduced reactivity as curing agents, thereby markedly reducing the properties of the vulcanizates.

Thus there is a need for an economical, efficient means for curing such prepolymers or polymers in the absence of premature reaction.

In particular, there is a need for a means for curing such prepolymers or polymers with a curing mixture which is conveniently stored and comingled with the prepolymer or polymer which is to be cured.

In essence, the curing of polymers effected with amines is thought to involve chain extension of a prepolymer or cross-linking of a polymer itself. In the case of the urethane and epoxy polymers, a prepolymer is generally transformed from a viscous liquid having a molecular weight of less than about 3,000 to a solid having a molecular weight in excess of 10,000. The solids range from rubbery materials to hard plastics with a wide variety of known uses, e.g., molded tires, machine parts and potting compositions. In the case of amine curable millable gums such as polychloroprene, the gum is converted to a cross-linked elastomer with valuable physical properties.

SUMMARY OF THE INVENTION

According to this invention it has unexpectedly been found that a dispersion, in a designated liquid vehicle, of a complex of 4,4'-methylene dianiline (MDA) and/or racemic 2,3-di(4-aminophenyl) butane may effectively be utilized to cure amine-curable polymers or prepolymers without a premature reaction between the curable polymer or prepolymer and the aforementioned diamines taking place.

The liquid vehicle for the dispersion must be carefully chosen and must have the following characteristics: Initially, the liquid vehicle which is used to contain the complex must be inert, that is to say it will not promote rapid decomposition of the complex. It must also be unreactive toward the polymer of prepolymer which is being cured. The vehicle must also be free flowing or mobile to facilitate comingling of the complex with the polymer or prepolymer. The preferred liquid vehicle is di(2-ethylhexyl)phthalate.

The particles of complex within the carrier liquid should contain no more than 10% of particles which have a diameter of 60 microns or more and preferably no more than 10% of particles having a diameter of 30 microns or more.

The curing agent is prepared by forming a complex between the 4,4'-methylene dianiline and a salt, the salt being selected from nitrites and halides, except the fluorides, of sodium and lithium and sodium cyanide or by forming a complex between racemic 2,3-di(4-aminophenyl) butane and a halide salt, except the fluoride, of sodium, potassium, rubidium and cesium. Specifically, the compositions to be utilized as curing agents for amine-curable polymers include the reaction products of 4,4'-methylene dianiline with the following salts, in the ratio of 3 moles of methylene dianiline to 1 mole of salt: sodium chloride, sodium bromide, sodium iodide, sodium nitrite, lithium chloride, lithium bromide, lithium iodide, lithium nitrite and sodium cyanide, and the reaction products of racemic 2,3-di(4-aminophenyl) butane with the following salts in the ratio of 3 moles of diamine to 1 mole of salt: sodium chloride, sodium bromide, sodium iodide, potassium chloride, potassium bromide, potassium iodide, rubidium chloride, rubidium bromide, rubidium iodide, cesium chloride, cesium bromide and cesium iodide.

Because of availability and cost, the complexes derived from 4,4'-methylene dianiline are preferred and those in which the salt is sodium chloride or lithium chloride are especially preferred. In the discussion which follows reference will generally be made only to the complexes of 4,4'-methylene dianiline, but it is understood that they would apply equally as well to the complexes of racemic 2,3-di(4-aminophenyl) butane.

The complex may be utilized for the curing of a variety of amine-curable prepolymers or polymers; most typical and preferred of these polymers are the urethane prepolymers or polymers. Curing with the complex, which is dispersed within the liquid vehicle, is effected by means known in the art.

DETAILED DESCRIPTION

There are a variety of methods for preparing the complexes of the instant invention.

In one method for preparing the complexes of this invention, an aqueous solution or brine containing a sodium or lithium salt selected from the class consisting of the chloride, bromide, iodide and nitrite is reacted with 4,4'-methylene dianiline (also referred to hereinafter as MDA), either in a solvent, having a degree of mutual solubility for both water and for the MDA, such as an alcohol, or with solid MDA in the substantial absence of a solvent. If the salt is present in relatively dilute concentration, for example between about 1% and about 12% by weight, a solvent for the MDA preferably is employed. If the salt is present in concentration above about 12 percent by weight, then no solvent need by employed, solid crystalline MDA being added directly to the salt solution.

A crystalline precipitate formed by interaction of the salt and the MDA is separated from the liquid phase, e.g., by filtration. The precipitate has a 3:1 mole ratio of MDA to salt and may be decomposed into its original constituents by adding a solvent such as acetone at an elevated temperature in the range of about 40° to 100°C., depending on the volatility of the solvent.

In the solvent method of preparing the complexes, a relatively dilute aqueous solution (1 to 12 percent by weight salt) of a sodium or lithium salt selected from the group comprising the chloride, bromide, iodide, and nitrite may be mixed with a solution of 4,4'-methylenedianiline in a suitable solvent, e.g., methanol at a temperature in the range from about 20° to 60°C. Under these conditions, the MDA reacts with the sodium or lithium salt to form a crystalline precipitate consisting of MDA and the salt in a 3:1 mole ratio. The crystalline precipitate is then separated from the mother liquid by filtration, decantation, centrifuging or other suitable operation.

In the method of preparation in which a more concentrated salt solution (more than about 12 percent by weight of salt may be employed, solid crystalline MDA is added to the salt solution with agitation at a somewhat higher temperature in the range of from about 50°C. to 90°C. in an amount somewhat in excess of the stoichiometric quantity required to react with that amount of salt which is present in excess of about 12 percent by weight. Under these conditions three mols of MDA react with one mol of salt to form a crystalline precipitate which may be separated from the remaining solution by filtration, decantation, centrifuging or other suitable operation.

Complexes of other salts, such as sodium nitrite may be formed by substantially the same procedures outlined for the sodium chloride complexes.

The complex as formed generally must be broken down to a particle size which will yield a stable, useful dispersion. At least about 90% of the particles should have a diameter of no more than 60 microns. It is preferred, however, that at least about 90% have a diameter of no more than 30 microns. In the most preferred embodiments of the instant invention the particle size of at least 90% of the particles should be 5 microns or smaller.

To obtain this particle size any standard technique for reducing the size of the particles may be utilized. It is preferred, however, to make use of a ball mill or a fluid energy mill. After dry grinding the complex can be dispersed in the liquid vehicle by means of any high shear mixer such as a three roll mill, colloid mill, or a ball mill. Equipment used by the paint industry for dispersing pigments in paint vehicles is also satisfactory. A concise description of grinding and milling equipment can be found in "The Encyclopedia of Chemical Process Equipment," W. J. Mead, Reinhold Publishing Corp., 1964, pps. 485–507 and 615–632. It should be noted that ball mills and other related tumbling mills can be used for wet grinding as well as dry grinding so that grinding and preparation of the dispersion can be accomplished in one operation.

The inert vehicle liquid for carrying the dispersion must have the following characteristics. Initially it must be inert so that it does not promote the decomposition of the complex. Next is must be unreactive toward the polymer that is being cured. The vehicle liquid should contain no functional groups which would be reactive with the amine groups of the complex or the amine-reactive groups present on the prepolymer. In the case of polyurethane applications the vehicle liquid should contain no active hydrogens which would react with the available isocyanate groups of the prepolymer.

The liquid must also be readily miscible with the prepolymer or polymer which is to be cured so that the liquid and polymer may be readily comingled. This represents a major advantage of the use of the dispersion since it serves to facilitate dispersion of the curing agent uniformly throughout the prepolymer or polymer without requiring the expenditure of much energy. It has been found that when the finely divided curing agent is added alone to the polymer or prepolymer that relatively intensive mixing is required to adequately disperse the curing agent. This is not just inconvenient but may result in some premature curing because of the heat generated from the mixing operation. It is believed that this difference in mixing ease is due to the presence of agglomerates of small particles in the dry curing agent which are not present in the dispersions of this invention. The importance of the mutual compatibility of the liquid phase of the curing agent dispersion and the polymer or prepolymer being cured is illustrated by the following example. Nujol oil — a saturated light hydrocarbon petroleum oil — readily forms a stable dispersion with the complex; however, the resultant mixture is incompatible with polyether polyurethanes and the Nujol dispersions are ineffective for curing such prepolymers.

Generally, the vehicle liquid will possess sufficiently low volatility so as not to vaporize from the cured polymer after curing or during end-use applications. The liquid vehicle may, however, be volatile as long as it is compatible with the polymer in applications where the loss of a solvent-like material could take place without difficulty such as in a surface coating. If the liquid vehicle is sufficiently low boiling, such as methylene chloride, it can serve as an expanding agent during the curing operation to yield cellular products.

Other properties of the vehicle liquid must take into consideration the application in which the composition is to be used; i.e., coatings may require a non-discoloring vehicle liquid, etc.

Typical examples of such vehicle liquids include di(2-ethylhexyl)phthalate, tetraethylene glycol bis(2-ethylhexanoate) and Dutrex 739 oil, an aromatic process oil which is a product of the Shell Oil Company and comprises 0% asphaltenes, 18% polar compounds, 76% aromatics and 6% saturated petroleum derivatives determined by the Clay-Gel method of ASTM D2007. Additional useful liquids include other esters of phthalic acid and related isophthalate and trimellitate esters, esters of aliphatic diacids such as adipic, azeleic and sebacic acids, aromatic and naphthenic hydrocarbon processing oils or extenders, halogenated biphenyls and liquid aromatic sulfonamides. Paraffinic hydrocarbon oils can also be used but in general they have limited compatibility with most of the well-known amine-curable polymers and therefore are of value only an rare occasion.

Liquids which would generally not be acceptable as vehicles include materials such as carboxylic acids which have a tendency to break down the amine-salt complex. In addition such liquids would not be acceptable with systems containing isocyanate or epoxy groups. As previously indicated, parafinnic oils are not suitable for many amine-curable polymers because of their limited compatibility.

In addition an oil-soluble dispersing agent may be added if desired. The dispersing agent serves to facilitate dispersion of the complex in the vehicle liquid and reduces the viscosity of the resulting dispersion. A typical dispersing agent which has proven effective is lecithin. Other oil-soluble surface active agents can be used including phosphated mono- and diglycerides, cetyl pyridinium bromide and cetyl trimethyl ammonium bromide. The following is indicative of the value of lecithin in the dispersions. The viscosity of a dispersion containing a mixture of equal weights of the complex and di(2-ethylhexyl) phthalate without lecithin has a Brookfield viscosity of about 16,000 cps, whereas the addition of 1% (based on the weight of complex) of lecithin reduces the viscosity to around 2,000 cps. Other materials may be included in the dispersion such as carbon black, pigments, antioxidants, flame retardants, etc.

Dispersions containing up to about 75 weight percent of complex can be prepared. Generally it is more convenient to prepare and use dispersions containing 40 to 60 weight percent of complex. Obviously, the dispersions can be prepared at or diluted to lower concentrations of the complex if desired. A surface active agent, if added, would constitute up to 5 weight percent based on the weight of complex and preferably 0.5 to 2.0 weight percent. It should be emphasized that the surface active agent is optional. It should also be noted that certain of the dispersions show thixotropic behavior which prevents settling during storage and workable viscosities under the shearing conditions encountered in pumping for example. Dispersions in di(2-ethylhexyl)azelate show this behavior.

The dispersion after it is formed may then be utilized for the curing of amine-curable prepolymers or polymers; typical of these polymers are the urethanes. Other prepolymers or polymers which may be cured with the complex of the instant invention include the following:

1. Epoxy resins such as those disclosed in the "Encylopedia of Polymer Science and Technology" Interscience Publishers, New York (1967), Volume 6, pps. 212-221. The curing of certain epoxy resins with methylene dianiline is described in U.S. Pat. No. 2,773,048 to Formo et al. In the present process, the amine complex can be used in equivalent amounts to those suggested for the free diamine by U.S. Pat. No. 2,773,048 and the "Encylopedia of Polymer Science and Technology," Volume 6, pps. 226-230.

2. Halogen-containing hydrocarbon polymers such as chloroprene polymers, chlorinated butyl rubber and chlorinated polyethylene and polypropylene. Chloroprene polymers are described in the "Encyclopedia of Polymer Science and Technology," Volume 3, (1965), pps. 705-728. Chlorinated butyl rubber and its curing by diamines is described in British Pat. No. 815,939. In curing halogen-containing polymers of these types with the complex used in the instant process, it is customary to include a metal oxide acid acceptor such as zinc oxide.

The curing or cross-linking of hydrofluorinated polymers with polyamines is disclosed in U.S. Pat. No. 2,979,490 to West.

3. Chlorosulfonated polymers such as those described in U.S. Pat. No. 2,723,257 to McAlevy, which patent relates to the curing of such polymers with aromatic diamines including methylene dianiline.

4. Polymers containing acid halide groups such as

and haloformate groups, such as

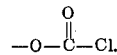

The curing of these polymers with methylene dianiline is analogous to the curing of chlorosulfonated polymers.

5. Polymers containing anhydride groups which on reaction with diamines yield amideacid linkages.

6. Organopolysiloxanes such as described in U.S. Pat. No. 2,938,010 to Bluestein, which patent relates to the use of diamines as curing agents for organopolysiloxanes.

All patents and articles referred to above are herein incorporated by reference.

The prepolymers and/or polymers are admixed with the dispersion described above and then cured by standard techniques.

Since the urethanes (that is, prepolymers and polymers containing isocyanato groups) are typical polymers which may be cured by the process of the instant invention a more detailed description of the curing procedure with the urethanes will be included; it should be emphasized that there is no intention to limit the invention, however, to the urethanes but rather all amine-curable polymers and prepolymers of which the above-mentioned are representative are intended to be within the scope of the instant invention.

The polyurethanes are generally formed by first reacting a polyether polyol or a polyester polyol with a molar excess of an organic diisocyanate to form a prepolymer having terminal isocyanato groups. The prepolymer is then cured to increase its molecular weight from less than about 3,000 to in excess of about 10,000. Examples of such polymers are described in U.S. Pat. Nos. 2,620,516, 2,777,831, 2,843,568, 2,866,774, 2,900,368, 2,929,800, 2,948,691, 2,948,707, 3,114,735; herein incorporated by reference.

Prior to the curing operation itself, the dispersion and the amine-curable polymer or prepolymer must be comingled. In the case of liquid polymers and prepolymers, such as isocyanate-terminated urethane prepolymers or liquid epoxy resins, the dispersion can be mixed with the curable polymer by means ranging from hand mixing with a spatula up to continuous high speed mixers of the type normally used for mixing diamines with polyurethane prepolymers. Comingling can also be effected in static mixing devices, e.g., Kenics Mixers (Kenics Corp.) alone or in combination with mechanical mixers. In order to insure vulcanizates free of bubbles the mixture of dispersion and prepolymer should be degassed by agitating under vacuum before use. Alternatively, the dispersion and prepolymer may be degassed separately prior to mixing under conditions which do not permit contact with gases such as air. In the case of a solid type polymer or gum which is to be cured, the dispersion may be comingled on a rubber mill or in an internal mixer (a Banbury Mixer). Once the gum has been banded on the mill or broken down in the internal mixer, the dispersion can be added directly and milling or mixing continued until a uniform mixture has been prepared.

In mixing the dispersion of complex with either fluid prepolymers or millable gums the temperature must be kept below the decomposition point of the complex in order to avoid the possibility of premature curing. In the present process the decomposition point of the complex is a function of the particular complex being used and the polymer in which the complex is dispersed. For isocyanatoterminated urethane prepolymers and the sodium chloride complex of methylene dianiline, mixing should be performed below 80°C. and preferably around 50°–60°C.

The temperature to be utilized during the curing of urethanes will be about 80°–180°C. Temperature is not particularly critical but it must be above the temperature at which the complex dissociates in the system being cured; this temperature will also vary with each particular complex. The complex between sodium chloride and 4,4'-methylenedianiline begins to dissociate at about 90°C. in a urethane system.

Full curing will ordinarily take about 1 minute to 24 hours depending on the temperature for urethanes when utilizing the MDA/sodium chloride complex. Preferred curing conditions range from ½ – 12 hours at temperatures ranging from about 100°–150°C. At these preferred curing temperatures sufficient cure to permit demolding occurs within about 5 seconds to 5 minutes because of the high reactivity of the MDA once it has been liberated from the complex. In the present process, the high reactivity of MDA becomes advantageous, whereas this reactivity prevented any practical use of MDA by prior art curing procedures in which gelation occurred before uniform mixing of free MDA and prepolymer could be accomplished. The present process provides unlimited time for mixing, prolonged storage of the mixture and ample time for filling the most complex of molds coupled with almost instant gelation permitting demolding as soon as the mixture is heated.

Curing times vary with other polymer systems as previously indicated. In general, cure times recommended for prior art curing processes using free diamines are satisfactory for the present process because recommended cure temperatures are generally in excess of the decomposition point of the complex. For epoxy resins, cure times of 15 seconds to 15 minutes at temperatures of 120°C. to 190°C. are suggested. For halogen-containing hydrocarbon polymers times of about 1 minute to 2 hours at temperatures of about 100° to 220°C. are suggested. Similar conditions can be used for chlorosulfonated polyethylene.

It is believed that the reactions which take place in the present curing process are identical to those which occur when free MDA is used as a curing agent by prior art curing procedures.

The curing equipment and curing procedures used in the present process are conventional.

The following examples are illustrative of the present invention and therefore are not intended in any way as a limitation on the scope thereof. Parts and percents are by weight unless otherwise indicated.

EXAMPLES

The following ASTM methods are employed for determining the physical properties of the cured polymers prepared in the examples.

| | |
|---|---|
| Modulus at 100% Elongation, $M_{100}$ | D412 |
| Modulus at 200% Elongation, $M_{200}$ | D412 |
| Modulus at 300% Elongation, $M_{300}$ | D412 |
| Tensile at Break, $T_B$ | D412 |
| Elongation at Break, $E_B$ | D412 |
| Permanent Set at Break, $S_B$ | D412 |
| Trouser Tear | D470* |
| Hardness, Shore A | D676 |
| Hardness, Shore D | D1484 |

* A 1.5"×3" rectangular test specimen having a 1.5" cut on the long axis is used to prevent "necking". The sample was pulled at 50 inches per minute.

Preparation of 4,4'-Methylene Dianiline/NaCl Complex

A solution of 250 g. of 4,4'-methylenedianiline in 1,000 ml. of methanol at 50°C. was mixed with a solution of 50 g. of sodium chloride in 250 ml. of water, also at 50°C. The mixture was cooled to 25°C. and crystals of the complex were collected on a coarse fritted filter funnel and washed three times with a total of 500 ml. of cold 80% methanol/20% water by volume solution. The crystals were air dried at about 25°C. Analysis: C, 71.4%; H, 6.5%. Calc.: C, 71.7%; H, 6.5%.

EXAMPLE 1

A. 25 pounds of di(2-ethylhexyl) phthalate are placed in a 35 gallon ball mill which is half full with grinding medium (½ – ¾ grinding stones). One-fourth pound (114 grams) of crude lecithin (Central Soya — Chemurgy Division) is added and dispersed in the diisooctyl phthalate by running the ball mill for 30 minutes. 25 pounds of tris(4,4'-methylene dianiline) sodium chloride complex (particle size > 60 microns) are added and the ball mill run for 24 hours at approximately 40 revolutions per minute. Samples are removed periodically and the ball mill vented to release the pressure build-up due to heating. Photomicrographs revealed that the average particle size of the largest measurable particles in the dispersion is reduced to approximately 15–17 microns after 6–8 hours of milling.

B. A similar dispersion is prepared in the ball mill using complex which is first ground in a fluid energy mill. In this case, wherein the starting particle size is 5 microns or less, adequate dispersion is achieved after only 4 hours of ball milling.

C. One hundred grams of a prepolymer prepared by reacting 2 moles of 2,4-tolylene diisocyanate with 1 mole of polytetramethylene ether glycol (molecular weight ~ 1,000) are thoroughly degassed by stirring at 80°C. and 5 mm Hg. The prepolymer is cooled to 50°C, then 33 grams of the dispersion from Part A or B of this example is mixed into the prepolymer with rapid mechanical stirring. The amount of dispersion provides enough curative to react with 100% of the available NCO in the prepolymer. The mixture of prepolymer and dispersion is stirred and degassed at 50°C. for 15 minutes, then poured into cavity molds and cured in a hydraulic press at 40,000 pounds ram pressure at 115°C. for 1 hour. The cured samples are equilibrated at room temperature and 50% relative humidity for 3 days before the following physical properties are measured:

| | |
|---|---|
| $M_{100}$, psi | 1300 |
| $M_{200}$, psi | 1600 |
| $M_{300}$, psi | 1900 |
| $T_B$, psi | 4300 |
| $E_B$, 100% | 530 |
| Permanent Set, % | 17 |
| Trouser Tear, pli | 230 |
| Hardness, Shore A | 90 |
| Hardness, Shore D | 42 |

Mixtures of dispersion and prepolymer prepared at 55°C. in continuous mixing equipment for cast polyurethanes ("Mark IV" Hydrospenser — Automatic Process Control, Inc., Union, N. J.) are still readily workable after 2 weeks storage at room temperature. This stable mixture can be cured whenever desired by heating to temperatures above about 100°C.

D. A dispersion of the complex is formed in an aromatic hydrocarbon petroleum oil containing 18% polar compounds, 76% aromatics and 6% saturates by ASTM D2007 (Dutrex 739 Oil, Shell Oil Co.). A sample of the complex, previously ground in a fluid energy mill to a particle size of about 5 microns is dispersed into the hydrocarbon oil by mixing with a notched-tooth radial mixer (Hockmeyer "Discsperser"). This mixer is typical of those used by the paint industry to disperse pigments in a vehicle. Equal weights of the complex and oil are mixed with enough lecithin equivalent to 1% of the weight of the complex. The mixer is run at 4,000 rpm for 6 minutes to produce the dispersion.

Thirty-three grams of the dispersion are mixed with 100 grams of the prepolymer described in 1C also at 4,000 rpm for 6 minutes. The resultant mixture is degassed at 50°C. and 5 mm Hg for 30 minutes, then press cured at 115°C. for 1 hour. The vulcanizate properties are listed below:

| | |
|---|---|
| $M_{100}$, psi | 1600 |
| $M_{200}$, psi | 2000 |
| $M_{300}$, psi | 3000 |
| $T_B$, psi | 5200 |
| $E_B$, % | 410 |
| Permanent Set, % | 10 |
| Trouser Tear | 210 |
| Hardness, Shore A | 94 |
| Hardness, Shore D | 49 |

E. A 50:50 dispersion of the complex can be prepared in mineral oil (Nujol) by the methods of parts A and B of Example 1. The resultant dispersion, however, is incompatible with the prepolymers of part C, and the mixtures do not produce solid rubber vulcanizates as do the di(2-ethylhexyl) phthalate or aromatic oil dispersions.

F. Substantially identical results are obtained in parts A and C of Example 1 when di(2-ethylhexyl) phthalate is replaced by an equal weight of tetraethylene glycol bis(2-ethylhexanoate).

EXAMPLE 2

The dispersion prepared in Example 1A is used to cure an epoxide polymer by mixing 6.8 grams of the dispersion with 6.25 grams of a liquid epoxy resin which is the reaction product of bisphenol A and epichlorohydrin having an epoxy equivalent of 200 (Epon 828, Shell Chemical Co.). The resulting mixture is poured into a mold and oven cured for 3 hours at 100°C. to yield a hard resilient cured product.

EXAMPLE 3

The following materials were mixed on a rubber mill at 50°C.

| Compounding Agents | Parts |
|---|---|
| Polychloroprene Polymer - Prepared substantially by the procedure of Example 2 of U.S. Patent 3,655,827 | 100 |
| N-Phenyl-α-naphthyl amine | 2.0 |
| Stearic Acid | 0.5 |
| Magnesia, Calcined | 1.0 |
| SRF Carbon Black | 58 |
| MDA/NaCl Complex dispersion prepared in Example 1A | 4.5 |
| Circo Oil | 10 |
| Zinc Oxide | 5.0 |
| Petrolatum | 1.0 |

The resulting formulation was cured for 30 minutes at 153°C. to yield a vulcanizate having the following physical properties:

| | |
|---|---|
| $M_{100}$, psi | 600 |
| $M_{200}$, psi | 1700 |
| $T_B$, psi | 2525 |
| $E_B$, % | 265 |

Again the resulting product has typical characteristics for a cured product of this type.

What is claimed is:

1. A process for curing an amine-curable polymer or prepolymer which comprises commingling said polymer with a dispersion of a curing agent in an inert carrier liquid, said curing agent being selected from the group consisting of (a) a complex of 4,4'-methylenedianiline and a salt selected from the group consisting of sodium chloride, sodium bromide, sodium iodide, sodium nitrite lithium chloride, lithium bromide, lithium iodide, lithium nitrite and sodium cyanide, and (b) a complex of racemic 2,3-di(4-aminophenyl)butane with a salt selected from the group consisting of sodium chloride, sodium bromide, sodium iodide, potassium chloride, potassium bromide, potassium iodide, rubidium chloride, rubidium bromide, rubidium iodide, cesium chloride, cesium bromide, and cesium iodide; the ratio of said dianiline or said racemic 2,3-di(4-aminophenyl)butane to said salt in said complex being 3 moles to 1 mole; the resulting dispersion containing up to 75 wt. % of said complex, and at least 90% of said particles of complex being less than about 60 microns in diameter, and subjecting the commingled polymer or prepolymer and dispersion to curing conditions.

2. The process of claim 1 wherein said curing agent is a complex of 4,4'-methylenedianiline and a salt selected from the group consisting of sodium chloride, sodium bromide, sodium iodide, sodium nitrite, lithium chloride, lithium bromide, lithium iodide, lithium nitrite and sodium cyanide.

3. The process of claim 2 wherein said prepolymer or polymer is a urethane containing free isocyanato groups.

4. The process of claim 3 wherein said curing takes place at a temperature of about 80°–180°C.

5. The process of claim 1 wherein said liquid is di(2-ethylhexyl) phthalate.

6. The process of claim 1 wherein said liquid is an aromatic process oil.

7. The process of claim 1 wherein said liquid is tetraethylene glycol bis(2-ethylhexanoate).

8. The process of claim 1 wherein said curing agent is a complex of 4,4'-methylene dianiline and sodium chloride.

9. The process of claim 1 wherein said dispersion contains a surface active agent.

10. A composition of matter comprising a mixture of particles of a complex dispersed in an inert liquid carrier, the resulting dispersion containing up to 75 wt. % of complex, said complex being selected from the group consisting of a) racemic 2,3-di(4-aminophenyl)butane and a salt selected from the group consisting of sodium chloride, sodium bromide, sodium iodide, potassium chloride, potassium bromide, potassium iodide, rubidium chloride, rubidium bromide, rubidium iodide, cesium chloride, cesium bromide and cesium iodide, and b) 4,4'-methylenedianiline and a salt selected from the group consisting of sodium chloride, sodium bromide, sodium iodide, sodium nitrite, lithium chloride, lithium bromide, lithium iodide, lithium nitrite and sodium cyanide; the ratio of said dianiline and said racemic 2,3-di(4-aminophenyl) butane to said salt in said complexes being 3 moles to 1 mole, and at least 90% of said particles of complex being less than about 60 microns in diameter.

11. The composition of claim 10 wherein said complex comprises 4,4'-methylenedianiline and a salt selected from the group consisting of sodium chloride, sodium bromide, sodium iodide, sodium nitrite, lithium chloride, lithium bromide, lithium iodide, lithium nitrite and sodium cyanide.

12. The composition of claim 11 wherein said salt is sodium chloride.

13. The composition of claim 10 wherein at least 90% of said particles of complex are less than about 30 microns in diameter.

14. The composition of claim 10 wherein at least 90% of said particles of complex are less than about 5 microns in diameter.

15. The composition of claim 10 wherein said liquid is di(2-ethylhexyl)phthalate.

16. The composition of claim 10 wherein said liquid is tetraethylene glycol bis(2-ethylhexanoate).

17. The composition of claim 10 wherein said inert liquid is selected from the group consisting of (a) esters of phthalic acid, isophthalic acid and aliphatic diacids, (b) aromatic and naphthenic hydrocarbon processing oils, (c) halogenated biphenyls, (d) liquid aromatic sulfonamides and (e) tetra ethylene glycol bis(2-ethylhexanoate).

* * * * *